United States Patent [19]
Nishio

[11] Patent Number: 6,045,164
[45] Date of Patent: *Apr. 4, 2000

[54] PIPE JOINT MADE OF RESIN

[75] Inventor: Kiyoshi Nishio, Sanda, Japan

[73] Assignee: Nippon Pillar Packing Co., Ltd., Osaka, Japan

[*] Notice: This patent is subject to a terminal disclaimer.

[21] Appl. No.: 09/234,325

[22] Filed: Jan. 21, 1999

[30] Foreign Application Priority Data

Feb. 2, 1998 [JP] Japan .................................. 10-020856

[51] Int. Cl.[7] ...................................................... F16L 25/00
[52] U.S. Cl. ........................ 285/331; 285/423; 285/342; 285/334.5
[58] Field of Search .................................. 285/331, 342, 285/423, 334.5

[56] References Cited

U.S. PATENT DOCUMENTS

| | | | |
|---|---|---|---|
| 3,649,050 | 3/1972 | Woodling | 285/12 |
| 5,154,453 | 10/1992 | Nishio | 285/423 |
| 5,388,871 | 2/1995 | Saitoh | 285/423 |
| 5,553,900 | 9/1996 | Fukumoto | 285/331 |
| 5,743,572 | 4/1998 | Nishio | 285/331 |

FOREIGN PATENT DOCUMENTS

| | | | |
|---|---|---|---|
| 12031 | 6/1880 | Germany | 285/331 |
| 417265 | 1/1967 | Switzerland | 285/331 |
| 487796 | 6/1938 | United Kingdom | 285/331 |
| 608412 | 9/1948 | United Kingdom | 285/331 |
| 852787 | 11/1960 | United Kingdom | 285/331 |

*Primary Examiner*—Eric K. Nicholson
*Attorney, Agent, or Firm*—Jones, Tullar & Cooper, P.C.

[57] ABSTRACT

The present invention relates to a pipe joint made of resin used for laying pipes in which a high-purity liquid, ultra pure water, a medical liquid or the like flow treated in production process in various on a side of an inner periphery thereof kinds technical fields such as production of semiconductor, medical supplies and medicines, food process, and chemical industry. A joint body is provided with a receiving port, a cylindrical portion and an annular groove portion, and an inner ring inserted by a pushing ring is provided with a cylindrical projection, a projection of the inner ring is divided into a guiding portion having a guiding surface inclining in a state of widening toward the tip thereof, on a side of an inner periphery thereof and an effective length portion having no guiding surface, a relation of a groove width A of the annular groove portion, a thickness width B of the tip of the guiding portion of the projection, and a thickness C of the effective length portion of the projection is B<A<C. According to the present invention, a sealing surface pressure is generated to both axial and radial directions, thereby making it possible to keep an efficient sealing property for a long time, at the same time while it facilitates a control of a fastening torque of the pushing ring.

10 Claims, 6 Drawing Sheets

PIPE JOINT MADE OF RESIN

BACKGROUND OF THE INVENTION

1. Field of the Invention

The present invention relates to a pipe joint made of resin, in particular, such a pipe joint applied to laying pipes for a high-purity liquid, ultra pure water and a medical liquid or the like used in a production process such as the production of semiconductor, medical supplies and medicines, food processing, and chemical industry.

2. Description of the Prior Art

Figure 8:
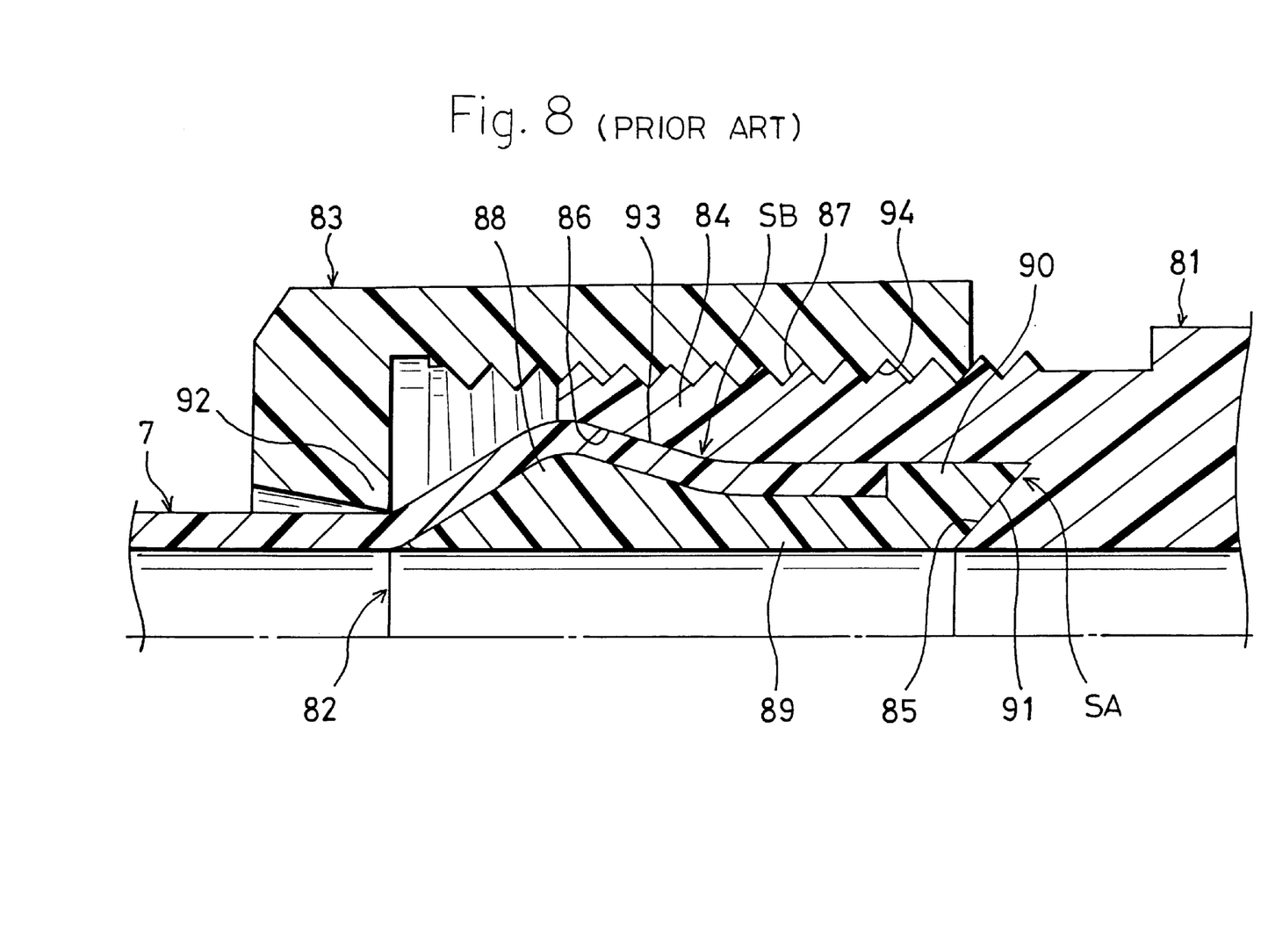
FIG. 8 is a partially longitudinal sectional side view of a conventional pipe joint made of resin.

Conventionally, such a pipe joint made of resin having a structure like that shown in FIG. 8 is known. The pipe joint made of resin shown in the same figure comprises a joint body 81, an inner ring 82 and a pushing ring 83. The joint body 81 has a receiving port 84, a tapered receiving surface 85 projecting from a base portion of the receiving port 84, and a tapered receiving surface 86 disposed on a tip portion of the receiving port 84. Additionally, an outer periphery of the receiving port 84 is provided with a male thread portion 87. The inner ring 82 includes a connecting portion 89 having a swelling or bulge portion 88 whose section is mountain-like or chevron-shaped, and a projector protruding portion 90. A tip of the protruding portion 90 is provided with a tapered primary seal urging face or abutting surface 91. The pushing ring 83 includes a pressing portion 92.

According to the known pipe joint made of resin, a diameter of an end portion of a pipe 7 made of resin forcedly inserted in the connecting portion 89 is increased, thereby forming a tapered abutting surface 93 on an outer surface of the pipe 7. The end portion of the pipe 7 is inserted into the connecting portion 89, the inner ring 82 connected to the pipe 7 is forcedly inserted in the receiving port 84 of the joint body 81 with the result that a female thread portion 94 of the pushing ring 83 previously fitted in the pipe 7 is threadedly connected to a male thread portion 87 of the receiving port 84, thus being fastened. Then, the pressing portion 92 of the pushing ring 83 pushes the inner ring 82 in a pressing direction, and the abutting surface 91 of the inner ring 82 forcedly abuts against the receiving surface 85 of the joint body 81, thereby forming an axial sealing portion SA, and the abutting surface 93 of the pipe 7 abuts against the receiving surface 86 of the receiving port 84, thereby forming an axial sealing portion SB.

In the conventional pipe joint made of resin shown in FIG. 8, the pushing ring 83 is fastened, thus generating a pressing-directional pressing force. Consequently, the sealing portions SA and SB are formed on two regions, and a sealing surface pressure in an axial direction is generated on the sealing portions SA and SB. Therefore, a creep and a stress relaxation with the passage of time are generated on the joint body 81 made of resin and the pushing ring 83, the pipe 7 or the like, whereby the sealing surface pressures of the sealing portions SA and SB are decreased with the result that there has been concern that the sealing property is lost relatively early.

Furthermore, in order to secure a predetermined sealing property, an amount of thread connecting the pushing ring 83, a fastening torque or the like are controlled in high accuracy, a fastening force generated by the pressing ring 83 has been required to be strictly set at a predetermined magnitude. Therefore, there are problems wherein an operating efficiency is lowered and high technique and skill are required in operation.

SUMMARY OF THE INVENTION

The present invention has been conducted in view of the above mentioned circumstances and problems. A pipe joint made of resin is provide according to the present invention which comprises an improvement over the prior art, wherein, on portions except two sealing portions SA and SB for generating an axial sealing surface pressure shown in the conventional embodiment in FIG. 8, sealing portions for generating a radial sealing surface pressure are formed.

The joint made of resin has adopted a structure wherein an axially long cylindrical projection disposed on a side of the inner ring is forcedly inserted in an axially long annular groove portion formed on a side of the joint body. In the pipe joint made of resin having this structure, an inner surface and an outer surface of the projection of the inner ring forcedly inserted in the annular groove portion are closely fitted in an inside surface and an outside surface of the annular groove portion on a side of the joint body, whereby the closely fitting portions make the sealing portions for generating the radial sealing surface pressure formed. This can provide the pipe joint made of resin with an excellent sealing property which can be exhibited regardless of the amount of fastening the pushing ring and a fastening torque; and sealing property deterioration owing to creep and stress relaxation with the passage of time is not easily caused.

However, according to the improved pipe joint made of resin, when the cylindrical projection on a side of the inner ring is forcedly inserted in the annular groove portion on a side of the joint body, there are problems wherein the projection cannot be inserted in the annular groove portion well, or a thrust required for forcedly inserting the projection in the annular groove portion is increased, with the result that the fastening torque required for connecting threadedly the pushing ring to the joint body becomes extremely great.

Therefore, an object of the present invention is to solve the noted problems. On a tip of the cylindrical projection on a side of the inner ring, a guiding portion is disposed for making it easy to insert the projection in the annular groove portion on a side of the joint body, and reducing the thrust required in forcedly inserting the projection in the annular groove portion, thus solving the noted problems.

A pipe joint made of resin including
a joint body made of synthetic resin,
a cylindrical receiving port disposed on an end portion of the joint body, a sleeve shaped inner ring being insertable in the receiving port, and
a connecting portion disposed on the inner ring, to be forcedly inserted in an end portion of a pipe made of synthetic resin so as to be connected to the pipe comprises:
a cylindrical portion disposed on the joint body so as to protrude inside of the receiving port, thereby having an annular groove between the receiving port and the cylindrical portion,
a protruding portion disposed on the inner ring, to protrude from the end portion of the pipe when the connecting portion is connected to the end of the pipe,
a cylindrical projection axially protruding from the protruding portion, and being inserted in the annular groove portion by inserting the protruding portion in the receiving port,
a pushing ring threadedly connected to the receiving port of the joint body,
a pressing portion disposed on the pushing ring, for applying a pressing force for pressing the inner ring in a pressing direction, to the inner ring which is connected to the end portion of the pipe and inserted in the receiving port when the pushing ring is threadedly connected to the receiving port.

According to the joint made of resin of the present invention, the connecting portion is forcedly inserted in the end portion of the pipe, and the projection of the inner ring connected to the pipe is inserted in the receiving port of the pipe body, thereby screwing the pushing ring into the receiving port of the joint body so as to fasten it. Then, the inner ring is pressed in a pressing direction by the pressing portion of the pushing ring, thus forcedly inserting the projection on a side of the inner ring in the annular groove portion on a side of the joint body.

The projection is divided into a guiding portion having a guiding surface on a side of an inner surface thereof, the guiding surface inclining in a state of widening toward a tip thereof, and an effective length portion having no guiding surface, and a relation among a groove width A of the annular groove portion disposed on the joint body, a thickness width B of the tip of the guiding portion of the projection and a thickness C of the effective length portion of the projection is B<A<C.

In the present invention having such an arrangement, in an initial stage of forced insertion, the guiding portion having the guiding surface of a state of widening toward the tip on a side of the inner surface thereof, is smoothly inserted in the annular groove portion. In a following stage, the effective length portion of the projection is guided by the guiding portion to be forcedly inserted in the annular groove portion. Moreover, by an effect of the guiding portion of the projection, the thrust required for forcedly inserting the projection in the annular groove portion may become small with the result that an extra fastening torque is not required when the pushing ring is screwed in the joint body. Consequently, the fastening torque of the pressing ring can be small.

Furthermore, under a condition wherein the cylindrical projection on a side of the seal ring is forcedly inserted in the annular groove portion on a side of the joint body, i) the inside surface of the annular groove portion and the inner surface of the projection respectively overlaps with each other in a radial direction, and ii) the outside surface of the annular groove portion and the outer surface of the projection respectively overlaps with each other in a radial direction, thereby forming the sealing portions for generating the radial sealing surface pressure. Therefore, a sealing property can be maintained by the radial sealing surface pressure generated on each sealing portion. Then, the radial sealing surface pressure is generated regardless of the fastening amount of the pushing ring and the fastening torque.

The guiding surface widening toward the tip may be a sectional linear tapered surface (namely, a tapered surface wherein a normal line is linear), it may be curved in an arc shape and inclined in a state of widening toward a tip thereof. When the guiding surface is formed as the sectional linear tapered surface, an opening angle θ of the guiding surface in regard to the end surface of the projection perpendicular to an axis of the projection may be 10° to 80°, preferably 30° to 60°. In addition, a ratio of the groove width A of the annular groove portion to the thickness C of the effective length portion of the projection (or C/A) is 1.01 to 1.5, preferably, 1.05 to 1.2. Furthermore, a ratio of the groove width A of the annular groove portion to the thickness width B of the tip of the guiding portion of the projection (or A/B) is 1.01 or more, preferably, 1.1 to 1.5.

In the pipe joint made of resin according to the present invention, an outer periphery of the projection may be provided with a resin layer for radially increasing the projection.

Effects exhibited by the pipe joint made of resin according to the present invention are concretely shown by embodiments as below.

The pipe joint made of resin according to each invention mentioned above, means not only a single pipe joint made of resin for connecting the pipe materials to each other, but also a pipe joint made of resin whose joint body is integrally included by an end of the pipe material or a fluid device.

As mentioned above, according to the present invention, the pipe joint made of resin wherein the early sealing property can be kept for a long period without severely controlling a torque for fastening the pushing ring, can be provided. Moreover, this can reduce the thrust required for forcedly inserting cylindrical projection of the inner ring in the annular groove portion on a side of the joint body with the result that it is not required to apply the extra fastening torque in fastening the pushing ring. Then, the operation can be smoothly performed.

DETAILED DESCRIPTION OF THE PREFERRED EMBODIMENTS

Referring now to the drawing, preferred embodiments of the invention are described below.

Figure 1:
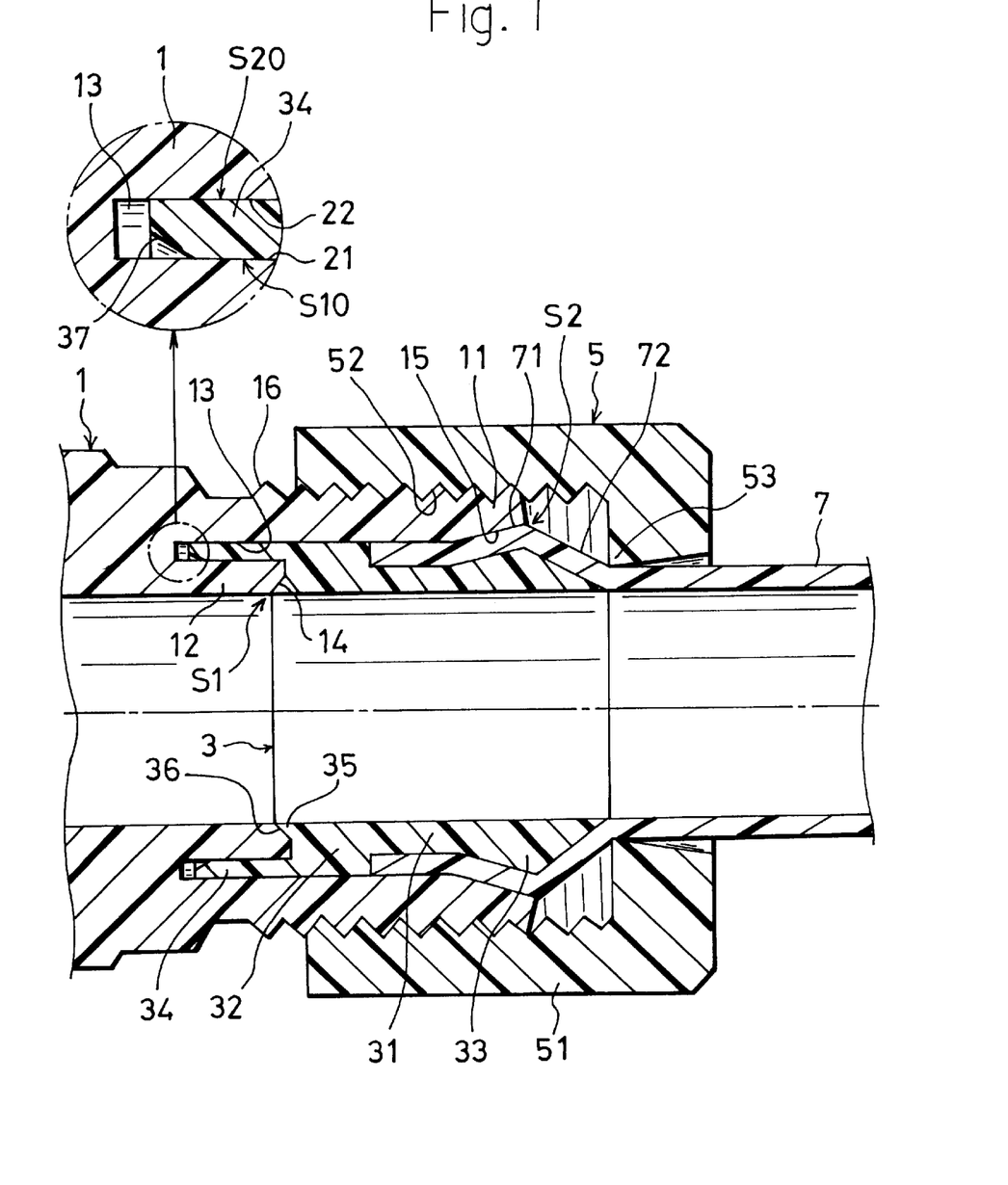
FIG. 1 is a longitudinal sectional side view of an embodiment of a pipe joint made of resin according to the present invention.

A pipe joint made of resin as shown in FIG. 1 or the like includes a cylindrical joint body 1, a cylindrical inner ring 3, and a cap nut shaped pushing ring 5. The joint body 1, the inner ring 3 and the pushing ring 5 are individually made of a synthetic resin such as PFA (Tetrafluoroetylen: Perfluoro alkoxyvinyl ether copolymer), PTFE (Polytetrafluoroetylene plastics), ETFE (Etylene-tryfluoro-etylene), CTFE (Chlorotryfluoro-etylene), ECTFE (Etylene-chloro-tryfluoroetylene), having a superior feature in resistance to chemicals and resistance to heat, such as fluororesin, which are integrally formed.

The joint body 1 has a cylindrical receiving port 11 on at least axial one end portion thereof. The joint body 1 is provided with a short cylindrical portion 12 protruding to an inside of the receiving port 11, and being concentrical with the receiving port 11, an annular groove portion 13 which is axially longer, disposed between the cylindrical portion 12 and the receiving port 11, and a tapered receiving surface 14 inclining so as to be widened toward a tip thereof, disposed on an inner peripheral side of the tip of the cylindrical portion 12. Moreover, on a tip of the receiving port 11, a receiving surface 15 which is tapered so as to be widened toward a tip thereof and concentrical with the receiving port 11, is disposed. Furthermore, the receiving port 11 has a male thread portion 16 on an outer peripheral portion thereof.

The inner ring 3 is formed so that an inside diameter thereof may have the same measurements as an inside diameter of the pipe material 7 made of synthetic resin and an inside diameter of the joint body 1. Therefore, when, as shown in FIG. 1, the pipe material 7 imbedding the inner ring 3 is connected to the pipe body 1, a fluid (or a liquid) flows smoothly inside each path of the pipe material 7, the inner ring 3 and the joint body 1.

Figure 2:
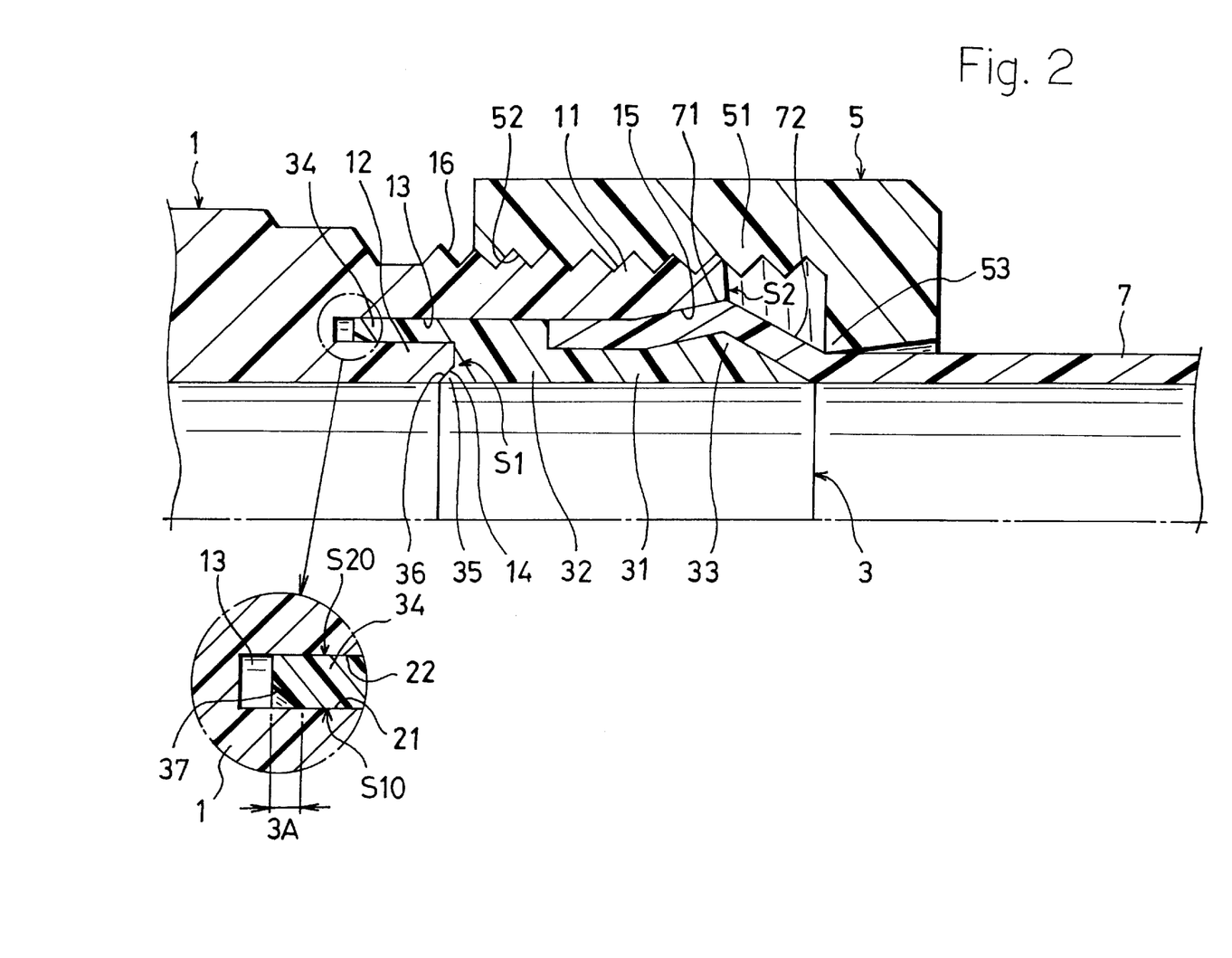
FIG. 2 is a longitudinal enlarged sectional view of enlarging an upper half portion of FIG. 1.

As shown in FIG. 1 or FIG. 2, the inner ring 3 includes a connecting portion 31 connected to the pipe material 7 made of synthetic resin by being forcedly inserted in an end of the pipe material 7, and a protruding portion 32 projected from the end of the pipe material 7 when the connecting portion 31 is connected to the end of the pipe material 7. The connecting portion 31 of the inner ring 3 includes a swelling portion 33 whose section is chevron. When the connecting portion 31 is forcedly inserted into an end of the pipe material 7, the diameter of the pipe material 7 forcedly inserted in the connecting portion 31 is increased, thus forming a tapered abutting surface 71 whose diameter is decreased as going to a tip of the pipe material 7 and a tapered receiving surface 72 whose diameter is increased as going to a tip of the pipe material 7. By inserting the protruding portion 32 in the receiving port 11, the protruding portion 32 is protrusively provided with an axially-long cylindrical projection 34 which is inserted in the annular groove portion 13, and a short inner projection 35 on an inside of the protruding portion 32. An outer surface of the short projection 35 is an abutting surface 36 inclining in a state of narrowing toward a tip thereof.

The pushing ring 5 has a female thread portion 52 on an inner peripheral portion of an outer ring portion 51. Additionally, a pressing portion 53 being radially small is continuously formed on an outer end portion of the outer ring portion 51. The inner diameter of the pressing portion 53 has measurements which enable the pressing portion 53 to be fitted in the pipe material 7, and is equal to that of the end on a radially smaller side of the receiving surface 72 on a side of the pipe material 7.

Figure 3:
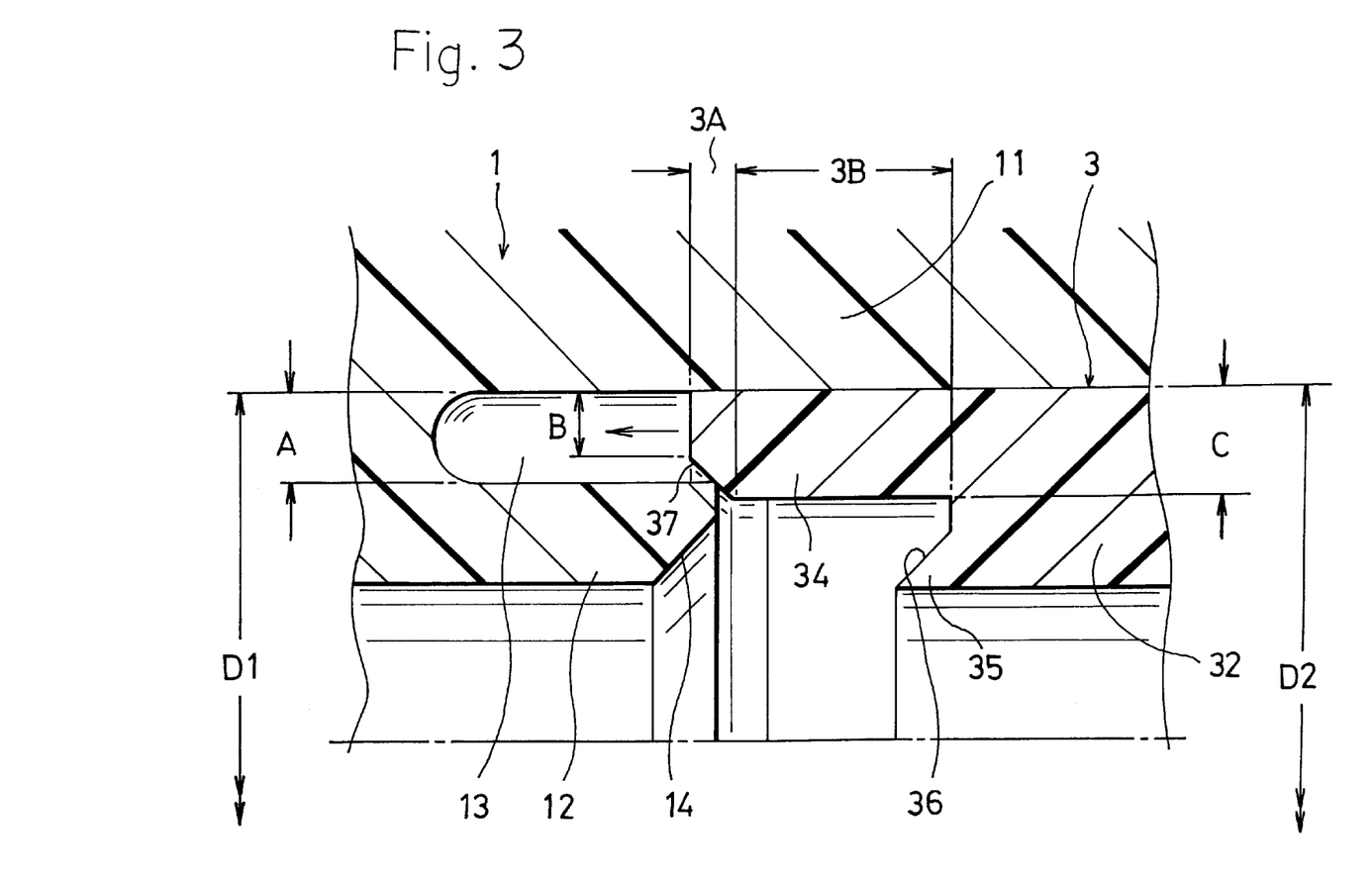
FIG. 3 is an enlarged sectional view of showing an initial stage in forcedly inserting a cylindrical projection on a side of an inner ring in an annular groove portion on a side of a joint body.
Figure 4:
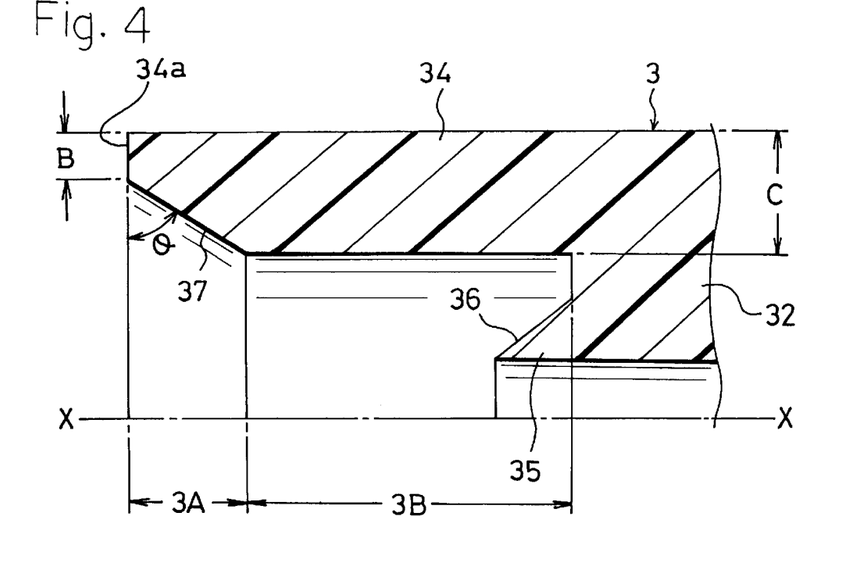
FIG. 4 is a sectional view illustrating a main portion of an inner ring.

Herein, as shown in FIG. 3 or 4, the axially-long cylindrical projection 34 protrusively disposed on the protruding portion 32 of the inner ring 3 is divided into a guiding portion 3A having a guiding surface 37 inclining in a state of widening toward a tip thereof, on a side of an inner periphery thereof and an effective length portion 3B having no guiding surface 37. Moreover, a relation of a groove width A of the annular groove portion 13 disposed on the joint body 1, a thickness width B of the tip of the guiding portion 3A of the projection 34 and a thickness C of the effective length portion 3B of the projection 34 is B<A<C. Furthermore, an outer diameter D1 of the annular groove portion 13 and an outer diameter D2 of the projection 34 have a relation of D1>D2 or D1=D2.

In the pipe joint, as shown in FIG. 1, the connecting portion 31 is forcedly inserted in an end portion of the pipe material 7, the protruding portion 32 of the inner ring 3 connected to the pipe material 7 is inserted in the receiving port 11 of the joint body 1, and the female thread portion 52 of the pushing ring 5 previously inserted in the pipe material 7 is threadedly fastened to the male thread portion 16 on a side of the joint body 1, whereby the pressing portion 53 of the pushing ring 5 presses an end portion on a side of a smaller diameter of the receiving surface 72 formed on a side of the pipe material 7, thereby applying a pressing-directional pressing force to the inner ring 3. Thus, when the inner ring 3 is pressed to the pressing direction, the receiving surface 14 on a side of the joint body 1 is opposed to the abutting surface 36 on a side of the inner ring 3, the receiving surface 15 on a side of the joint body 1 is opposed to the abutting surface 71 on a side of the pipe material 7, and the projection 34 on a side of the inner ring 3 is forcedly inserted in the annular groove portion 13 on a side of the joint body 1. Seeing from FIGS. 1 and 2, i) at least one of the receiving surface 14 on a side of the joint body 1 and the abutting surface 36 on a side of the inner ring 3 is closely fitted to the other, and ii) at least one of the receiving surface 15 on a side of the joint body 1 and the abutting surface 71 on the pipe material 7 is closely fitted to the other, thereby forming a sealing portion S1 and a sealing portion S2 for generating an axial sealing surface pressure. Moreover, the projection 34 is closely fitted in the inside surface 21 and the outside surface 22 of the annular groove portion 13, thereby forming respectively sealing portions S10 and S20 on the closely fitting portions. On the sealing portions S10 and S20, a radial sealing surface pressure is generated. The sealing surface pressure is generated regardless of an amount of fastening the pushing ring 5 and a fastening torque, thereby making it possible to obtain a stable sealing surface pressure with the result that it is not required to control strictly the fastening torque of the pushing ring 5.

Herein, in an initial stage wherein the projection 34 on a side of the inner ring 3 is forcedly inserted in the annular groove portion 13 on the side of the joint body 1, a relation between the groove width A of the annular groove portion 13 and the thickness width B of the tip of the guiding portion 3A of the projection 34 is B<A. As a result, the guiding portion 3A including the guiding surface 37 on a side of the inner surface thereof, having a state of widening toward a tip thereof is smoothly inserted in the annular groove portion 13. In a following stage, a relation between the groove width A of the annular groove portion 13 and the thickness C of the effective length portion 3B of the projection 34 is A<C. The effective length portion 3B of the projection 34 is guided by the guiding portion 3A, whereby the effective length portion 3B is smoothly forcedly inserted in the annular groove portion 13. Therefore, a thrust required for forcedly inserting the projection 34 in the annular groove portion 13 may be small. Consequently, when the pushing ring 5 is threadedly screwed into the joint body 1, an extra fastening torque is not necessary with the result that the small fastening torque of the pushing ring 5 may be enough.

Figure 5:
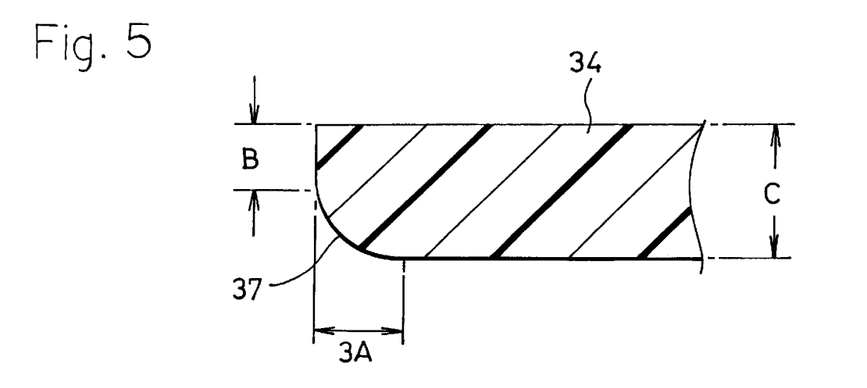
FIG. 5 is a sectional view illustrating another shape of a guiding surface.

Though, as shown in FIGS. 3 and 4, the guiding surface 37 having a state of widening toward a tip thereof may be a sectional linear tapered surface (namely, a tapered surface wherein a normal line is linear), it may be curved in an arc shape and inclined in a state of widening toward a tip thereof, in the same way as the guiding surface 37 shown in FIG. 5. When the guiding surface 37 is formed in a state of a sectional linear tapered surface as shown in FIGS. 3 and 4, it is necessary that an opening angle θ of the guiding surface 37 in relation to the end surface 34a of the projection 34 perpendicular to an axis of X—X of the projection 34 in FIG. 4 is 10° to 80°. Preferably, it is 30° to 60°. When the opening angle θ is 80° or more, the guiding portion 3A is too long in relation to the length of the projection 34 and the effective length portion 3B is too short to an amount of an extension of the guiding portion 3A. Therefore, of the sealing portions S10 and S20 formed by closely fitting portions wherein the inside surface 21 and the outside surface 22 of the annular groove portion 13 are closely fitted to the projection 34 as shown in FIGS. 1 and 2, there is a fear wherein especially a reliability of the inner sealing portion S10 is lost. On the other hand, when the opening angle θ is 10° or less, the guiding surface 37 abuts against the tip of the cylindrical portion 12 thereby making it impossible to exhibit an enough guiding effect. Then, in the initial stage of the forcedly insertion as shown in FIG. 3, a reducing effect for reducing the thrust required for forcedly inserting the projection 34 in the annular groove portion 13 is not enough, and it is easy to deform or damage the tip of the cylindrical portion 12 abutting against the guiding surface 37.

Therefore, even if the effective length portion 3B can be ensured to be long, it is difficult to ensure the axial surface pressure of the sealing portion S1 (shown in FIG. 2) formed by a closely fitting portion wherein the receiving surface 14 of the cylindrical portion 12 on a side of the joint body 1 is closely fitted to the abutting surface 36 of the projection 32 on a side of the inner ring 3. When the opening angle θ is between 10° and 80°, a sealing reliability of the sealing portions S10 and S20 can be kept, and the reducing effect for reducing the thrust required for forcedly inserting the projection 34 in the annular groove portion 13 can be exhibited enough. Especially, when the opening angle θ is 30° to 60°, such an effect is extremely exhibited.

The relation among the groove width A of the annular groove portion 13 and the thickness width B of the tip of the guiding portion 3A of the projection 34 and the thickness C of the effective length portion 3B of the projection 34 is B<A<C, the relation of A<C is a condition for generating the necessary radial sealing surface pressure, and preferably, a ratio of the both or C/A is 1.01 to 1.5. If it is within the above scope, even if the fastening torque of the pushing ring 5 is not abnormally great, the projection 34 on a side of a seal ring 3 can be naturally inserted in the annular groove portion 13 on a side of the joint body 1, and an enough great radial sealing surface pressure is generated. In particular, a preferable scope of the ratio C/A is 1.05 to 1.2. On the other hand, of the relation of B<A<C, B<A is a condition for smoothly inserting the tip of the projection 34 in the annular groove portion 13 in the initial stage of the forced insertion, the ratio A/B may be 1.01 or more, preferably, 1.1 to 1.5.

Figure 6:
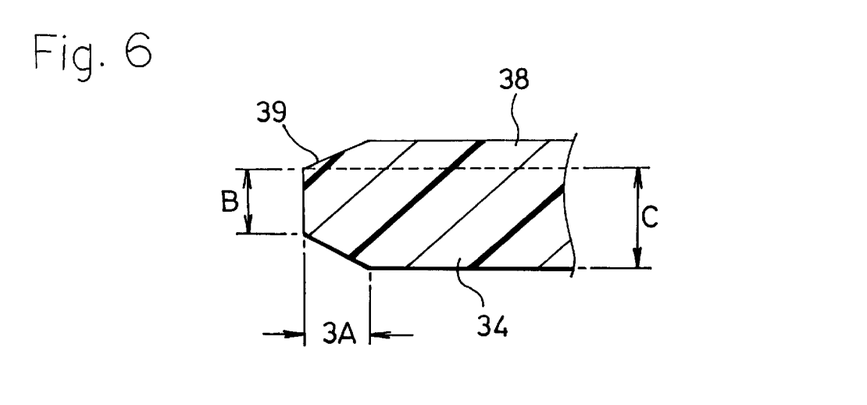
FIG. 6 is a sectional view illustrating the cylindrical projection whose diameter is increased.
Figure 7:
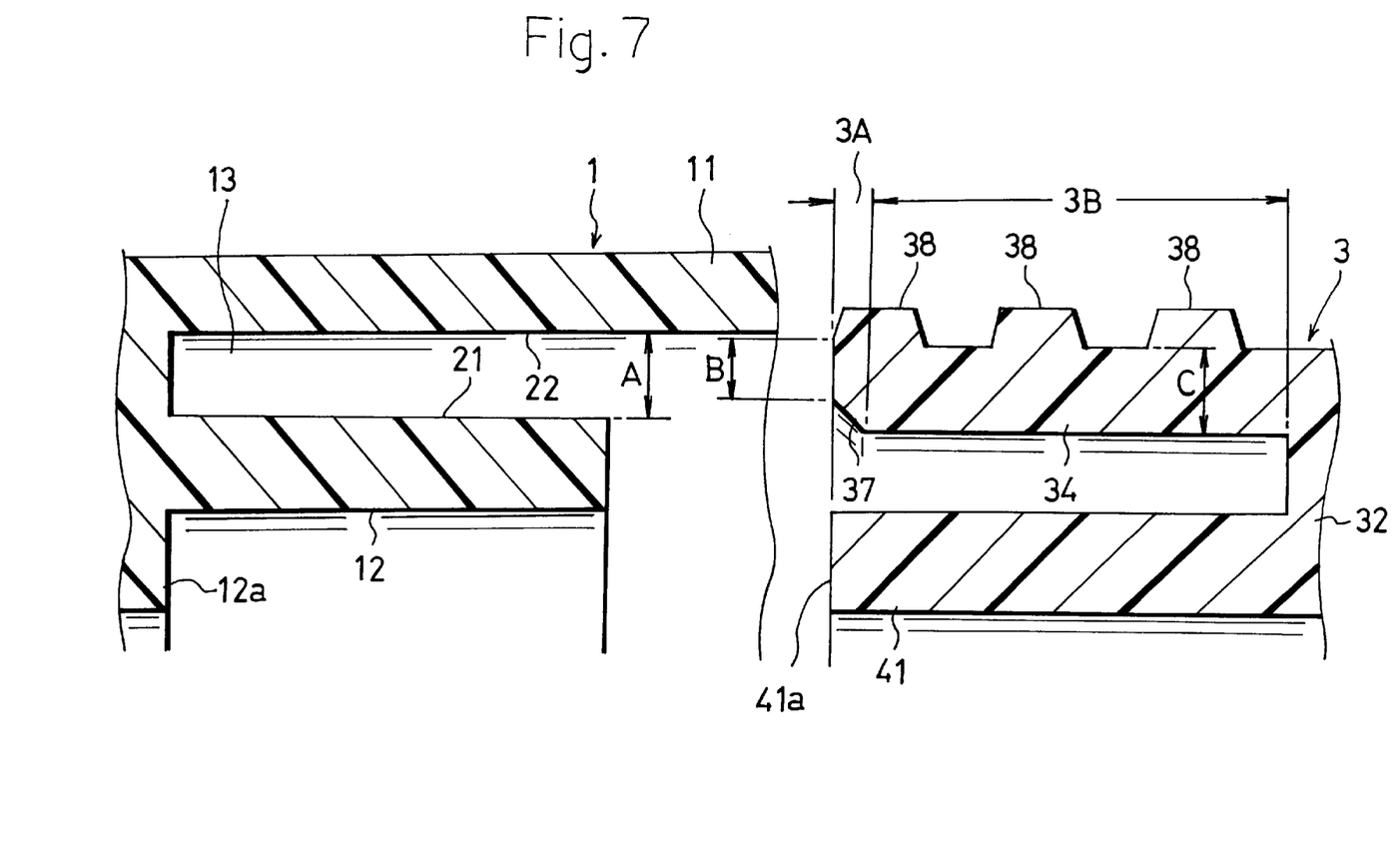
FIG. 7 is an enlarged sectional view of each main portion of the inner ring having the joint body and the cylindrical projection whose diameter is increased.

In the pipe joint made of resin according to the present invention, a resin layer for increasing a diameter of the projection 34 may be integrated with the projection 34 on an outer surface of the projection 34 on a side of the inner ring 3. FIG. 6 shows the projection 34 having the above structure and a resin layer 38 for increasing the diameter of the projection 34. Preferably, such a projection 34 is provided with the guiding surface 39 being a tapered surface, inclining in a state of narrowing toward the tip of the resin layer 38. As shown in FIG. 7, the resin layer 38 for increasing the diameter of the projection 34 may be formed as a number of rings axially arranged. Thus, the projection 34 is inserted in the annular groove portion 13 on a side of the joint body 1, whereby a number of resin layers 38 arranged in a state of rings are surely fitted in the outside surface 22 of the annular groove portion 13, and the sealing property of the sealing portion (corresponding to the sealing portion S20 shown in FIGS. 1 and 2) formed by the closely fitting portion is enhanced. The inner ring 3 shown in FIG. 7 is provided with an inside projection 41 concentric with the projection 34. When the projection 34 is forcedly inserted in the annular groove portion 13 on a side of the joint body 1, the inside projection 41 is held by inside of the cylindrical portion 12 on a side of the joint body 1, an end surface 41a of the inside projection 41 abuts against a stepped surfaced 12a disposed on a base of the cylindrical portion 12 so that they may be fitted in each other, thereby forming a sealing portion for generating the axial sealing surface pressure by means of the fitting portion.

The entire disclosure of Japanese Patent Application No. 10-20856 filed on Feb. 2, 1998 including specification, claims drawing and summary are incorporated herein by reference in its entirety.

What is claimed is:

1. A pipe joint made of resin including
a joint body made of synthetic resin,
a cylindrical receiving port disposed on an end portion of the joint body, a sleeve shaped inner ring for insertion in the receiving port, and
a connecting portion disposed on the inner ring for forced insertion in an end portion of a pipe made of synthetic resin so as to be connected to the pipe, comprising:
a cylindrical portion disposed on the joint body so as to protrude inside of the cylindrical receiving port, thereby defining an annular groove between the cylindrical receiving port and said cylindrical portion;
a protruding portion disposed on the inner ring, protruding from the end portion of the pipe when the connecting portion is connected to the end of the pipe;
a cylindrical projection axially protruding from the protruding portion, for insertion in said annular groove by inserting said protruding portion in the receiving port;
a pushing ring threadedly connected to the receiving port of the joint body; and
a pressing portion disposed on said pushing ring, for applying a pressure force for pressing said inner ring in a pressing direction, to said inner ring which is connected to the end portion of the pipe and inserted in the receiving port when said pushing ring is threadedly connected to the receiving port.

2. A pipe joint made of resin according to claim 1, wherein the projection is divided into a guiding portion having a guiding surface on a side of an inner surface thereof, the guiding surface inclining in a state of widening toward a tip thereof, and an effective length portion having no guiding surface, and
a relation among a groove width A of the annular groove portion disposed on the joint body, a thickness width B of the tip of the guiding portion of the projection and a thickness C of the effective length portion of the projection is B<A<C.

3. A pipe joint made of resin according to claim 2, wherein the guiding surface having a state of widening toward a tip thereof is a sectional linear taper surface.

4. A pipe joint made of resin according to claim 3, wherein an opening angle θ of the guiding surface in relation to an end surface of the projection perpendicular to an axis of the projection is 10° to 80°.

5. A pipe joint made of resin according to claim 3, wherein an opening angle θ of the guiding surface in relation to an end surface of the projection perpendicular to an axis of the projection is 30° to 60°.

6. A pipe joint made of resin according to claim 2, wherein a ratio of the groove width A of the annular groove portion to the thickness C of the effective length portion of the projection, (or A/C) is 1.01 to 1.5.

7. A pipe joint made of resin according to claim 2, wherein a ratio of the groove width A of the annular groove portion to the thickness C of the effective length portion of the projection, (or A/C) is 1.05 to 1.2.

8. A pipe joint made of resin according to claim 2, wherein a ratio of the groove width A of the annular groove portion to the thickness width B of the tip of the guiding portion of the projection, (or A/B) is 1.01 or more.

9. A pipe joint made of resin according to claim 2, wherein a ratio of the groove width A of the annular groove portion to the thickness width B of the tip of the guiding portion of the projection, (or A/B) is 1.1 to 1.5.

10. A pipe joint made of resin according to claim 1, wherein an outer periphery of the projection is provided with a resin layer for increasing a diameter of the projection.

* * * * *